United States Patent [19]

Schulz

[11] 4,288,990
[45] Sep. 15, 1981

[54] CONTROLLER FOR AN AIR CONDITIONING OR HEATING SYSTEM

[76] Inventor: Daniel R. Schulz, 1009 Hollywood Ave., Clearwater, Fla. 33519

[21] Appl. No.: 129,690

[22] Filed: Mar. 12, 1980

Related U.S. Application Data

[63] Continuation of Ser. No. 30,369, Apr. 16, 1979, abandoned.

[51] Int. Cl.³ .......................... H02J 1/00; F25B 49/00
[52] U.S. Cl. ................................. 62/158; 236/46 R; 307/39; 361/22
[58] Field of Search .............. 236/46; 307/39; 165/12, 165/11; 361/22, 23; 62/158

[56] References Cited

U.S. PATENT DOCUMENTS

| | | | |
|---|---|---|---|
| 3,011,718 | 12/1961 | Joerren | 236/1 R |
| 3,946,574 | 3/1976 | Portera | 62/158 |
| 4,027,171 | 5/1977 | Browder et al. | 236/46 R |
| 4,107,941 | 8/1978 | Hamilton | 236/1 R |
| 4,142,375 | 3/1979 | Abe et al. | 361/22 |

*Primary Examiner*—William E. Wayner
*Attorney, Agent, or Firm*—Stein & Frijouf

[57] ABSTRACT

An apparatus is disclosed for activating a thermostat for an air conditioning or heating system. The apparatus comprises a control circuit and a controllable switch connected to activate and deactivate the thermostat controlling the air conditioning or heating system. A timing circuit provides a first timing period in which the thermostat is deactivated in addition to providing a second timing period to activate the thermostat. The control also includes a circuit for deactivating the thermostat for a period of time in the event the compressor terminates operation for any reason. An optional occupancy sensor increases the time of deactivation of the thermostat during periods of non-use of the area being air conditioned or heated. The foregoing abstract is merely a resume of one general application, is not a complete discussion of all principles of operation or applications, and is not to be construed as a limitation on the scope of the claimed subject matter.

15 Claims, 7 Drawing Figures

U.S. Patent  Sep. 15, 1981  Sheet 1 of 2  4,288,990
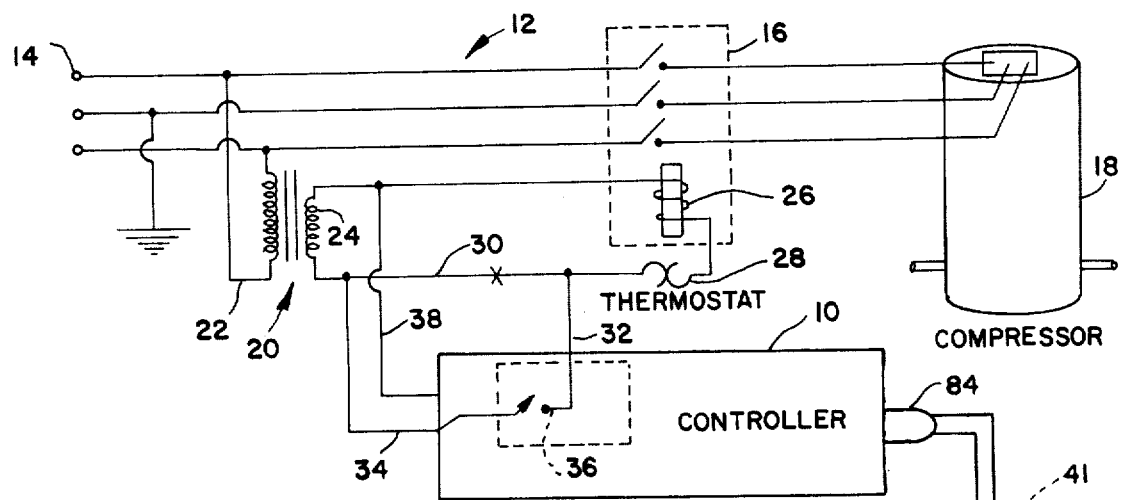
FIG. 1
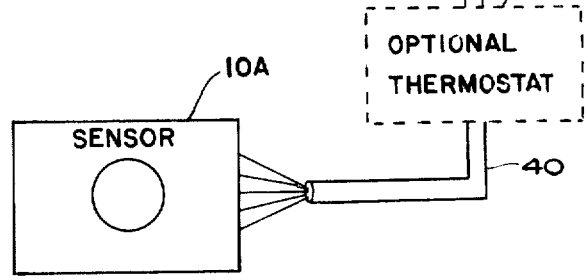
FIG. 2
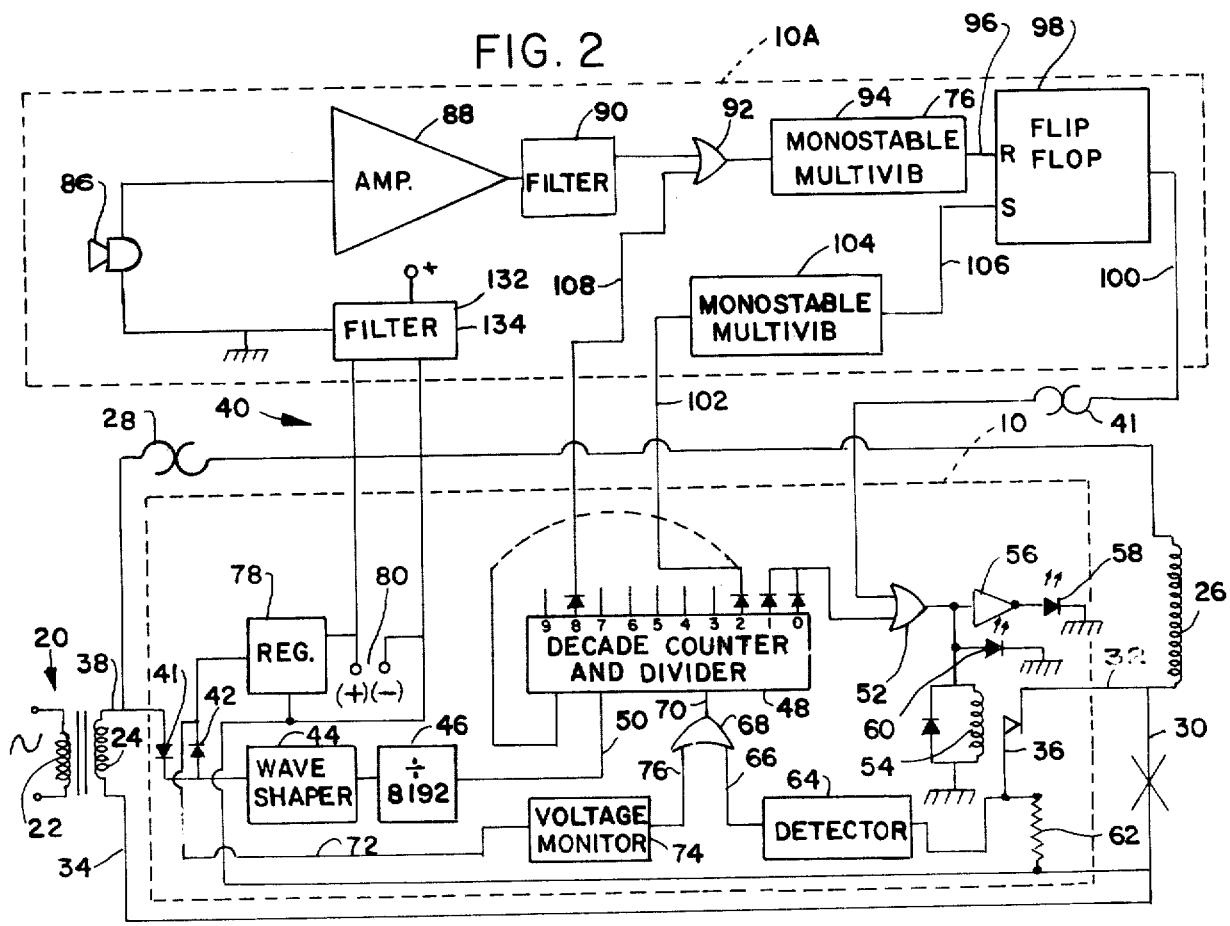

FIG. 4A — NO SENSOR — CLOSED / OPEN
FIG. 4B — SENSOR-UNOCCUPIED — CLOSED / OPEN
FIG. 4C — SENSOR-OCCUPIED — CLOSED / OPEN; ▨ = ON DUE TO ACOUSTIC NOISE
FIG. 4D — LINE VOLTAGE

CONTROLLER FOR AN AIR CONDITIONING OR HEATING SYSTEM

This is a continuation of application Ser. No. 30,369, filed Apr. 16, 1979, now abandoned.

BACKGROUND OF THE INVENTION

1. Field of the Invention

This invention relates to air conditioning and/or heating and more particularly to a control circuit for cooperation with a thermostat of an air conditioning or heating system.

2. Description of the Prior Art

Various types of apparati have been devised in the prior art in an attempt to deactivate a thermostat of an air conditioning or heating system for a period of time in order to reduce the operational cost. Various types of mechanical timers have been incorporated to enable the thermostat to operate for a first period of time and to deactivate the thermostat for a second period of time. Electronic circuits have also been devised to accomplish the same or similar task. Unfortunately, these devices were not synchronized with the operation or status of the thermostat and accordingly the compressor could be subjected to rapid starting and stopping creating excessive pressures within the compressor. Many air conditioning experts hesitate to recommend mechanical cycles due to the possibilities of the excessive pressures created within the compressor due to the rapid starting and stopping of the compressor.

In an attempt to overcome this hazard, others in the prior art have developed circuits which prohibit operation of the compressor for a given period of time after the compressor has terminated operation.

Others in the prior art have developed line voltage sensors for terminating operation of the compressor upon a reduction of line voltage. Unfortunately, the aforementioned contributions of the prior art have never been consolidated into a simple and inexpensive unit. Most of the prior art units were overly complex and unreliable and accordingly did not find widespread use in the art.

Therefore it is an object of this invention to provide an apparatus which overcomes the aforementioned inadequacies of the prior art devices and provides an improvement which is a significant contribution to the advancement of the air conditioning and heating art.

Another object of this invention is to provide an apparatus for activating a thermostat for an air conditioning or heating system comprising a timer circuit for deactivating the thermostat during a first timing period and for activating the thermostat during a second timing period thereby enabling the thermostat to power the air conditioning or heating system.

Another object of this invention is to provide an apparatus for activating a thermostat for an air conditioning or heating system for deactivating the compressor or heater when the source voltage is reduced below a preselected minimum power level.

Another object of this invention is to provide an apparatus for activating a thermostat for an air conditioning or heating system wherein the apparatus automatically disconnects from a conventional thermostat system in the unlikely event that the apparatus malfunctions.

Another object of this invention is to provide an apparatus for activating a thermostat for an air conditioning or heating system for terminating operation of the compressor in the event of loss of one phase of a plural phase power source.

Another object of this invention is to provide an apparatus for activating a thermostat for an air conditioning or heating system utilizing a presence sensor for determining the presence or activity within the area being air conditioned or heated to accordingly vary the operation time of the air conditioning or heating system.

The foegoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention may be incorporated into an apparatus for activating a thermostat for an air conditioning or heating system wherein the thermostat controls power from a power source to an air conditioning or a heating system. The invention comprises a timing circuit providing a first output during a first timing period and a second output during a second timing period. A controllable switch means is connected to activate or deactivate the thermostat controlling the air conditioning or heating system. The first output is connected to the controllable switch means for deactivating the thermostat during the first timing period. The second output is likewise connected to the controllable switch means for activating the thermostat during the second timing period thereby enabling the thermostat to provide power to the air conditioning or heating system. A thermostat line sensor means senses the condition of the thermostat line to reset the timing circuit to the first timing period upon the deactivation of the thermostat. A power source sensor means senses the level of available power from the power source to reset the timing circuit to the first timing period upon a reduction of level of the power source below a preselected minimum power level.

In more specific embodiments of the invention, the timing circuit includes a counter for counting at least a portion of the cycles of an alternating current power source. In this embodiment, the timing circuit includes a divider circuit for providing a divider circuit output upon counting a preselected number of input pulses. The timing circuit may include a wave shaper for modifying the alternating current sine wave into a square wave or similar waveform enabling easy counting by the counter. Accordingly, the counter provides a first output while counting a first number of input pulses and provides a second output upon counting a predetermined first number of input pulses. Likewise, the counter provides a second output while counting a second number of input pulses and provides the first output sequentially upon counting a preselected second number of input pulses.

Preferably, the thermostat controls a power switch which interconnects the power source to the air conditioning or heating system. The power switch may be in the form of a thyristor or a relay with the controllable switch being connected in series therewith. In a preferred embodiment of the invention, the thermostat line sensor means includes a voltage sensor connected to the controllable switch. A monostable device is activated by the voltage sensor for resetting the timing circuit upon termination of power to the air conditioning or heating system. The power source sensor may comprise a capacitor for storing a charge in accordance with the power level of the power source. Means are provided for comparing the voltage on the capacitor to a preestablished voltage standard to terminate operation of the air conditioning or heating system upon the power source voltage falling below the preselected voltage standard.

The invention may optionally include a presence sensor for sensing the presence of movement within the area being air conditioned or heated. In this embodiment, the output of the presence sensor is connected to the controllable switch for deactivating the thermostat during at least a portion of the second timing period upon the presence sensor detecting an absence of movement within the area being air conditioned or heated. The presence sensor preferably includes an acoustic transducer for detecting acoustical output due to movement within the area being air conditioned or heated. To more accurately process the signals, a filter network interconnects the acoustical transducer to the controllable switch means. The filter network differentiates between external noise and internal noise within the area being air conditioned or heated. A prime objective of the presence sensor is to deactivate the controllable switch during only a portion of the second timing period. Preferably, means such as a timing override is connected to the second controllable switch means to activate the controllable switch means during at least a portion of the second timing period irrespective of the output of the presence sensor.

The apparatus with the presence sensor may be incorporated within an air conditioning or heating system of a motel room, a commercial building, or a residence. The timing circuit provides the first period of time wherein the air conditioning compressor or heating element is deactivated to provide a substantial energy savings. The presence sensor further deactivates the thermostat during the second timing period in accordance with the use within the area being air conditioned or heated as determined by the acoustic output within the area. Human movement within the area will cause acoustical output thereby providing a maximum of operating time for the air conditioning or heating system. An absence of movement within the area being air conditioned or heated will cause a minimum of operating time of the air conditioning or heating system. The timing circuit provides a maximum and minimum operating time of the air conditioning compressor or heating element with the actual operating time being determined in part by the activity within the area being air conditioned or heated.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a block diagram of the apparatus interconnected with a conventional air conditioning system;

FIG. 2 is a block diagram of a controller and a presence sensor of the apparatus shown in FIG. 1;

FIG. 4 A, B, C, and D illustrate various waveforms and duty cycles present in the controller shown in FIGS. 1-3.

Similar reference characters refer to similar parts throughout the several views of the drawings.

DETAILED DESCRIPTION OF THE DRAWINGS

Figure 3:
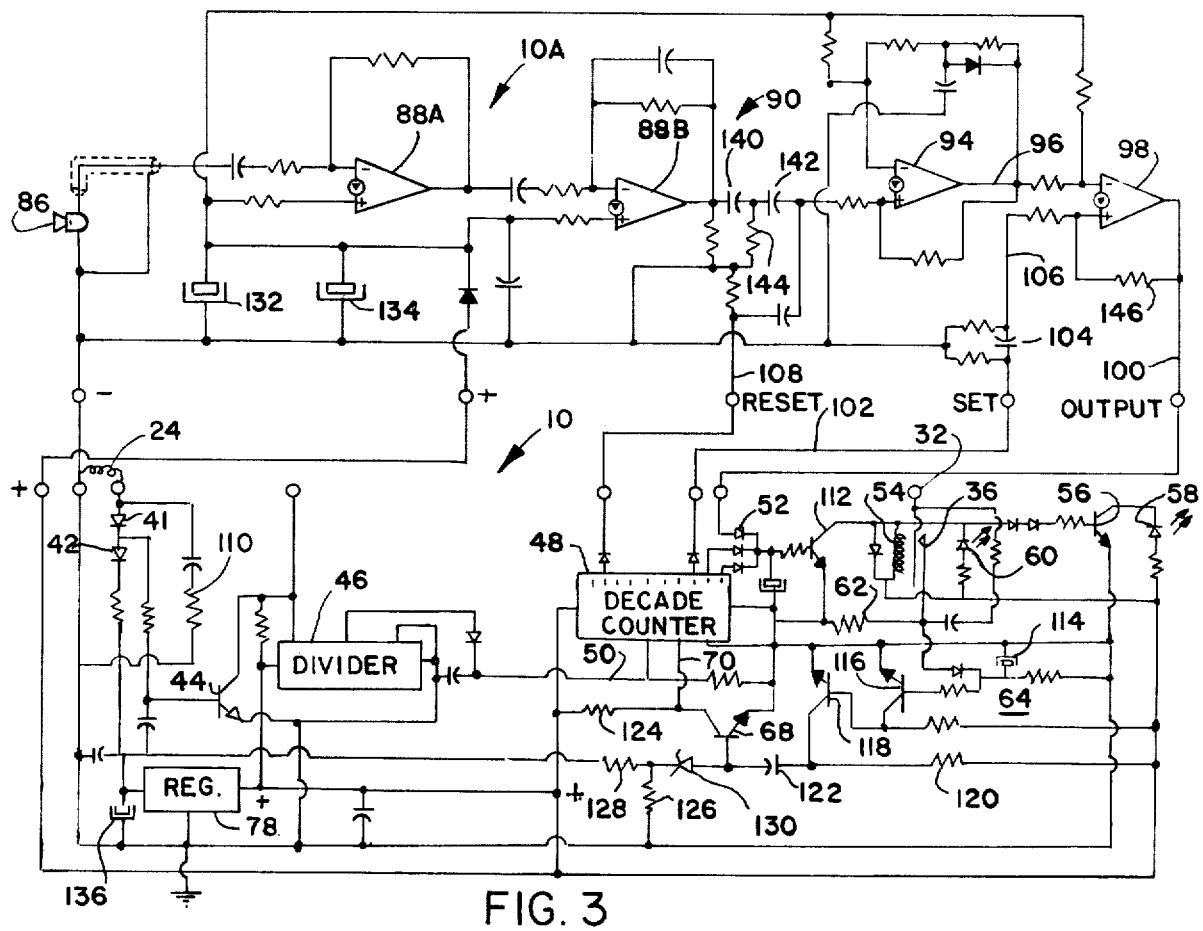
FIG. 3 is a schematic diagram of the controller and the presence sensor shown in FIGS. 1 and 2.
Figure 3:
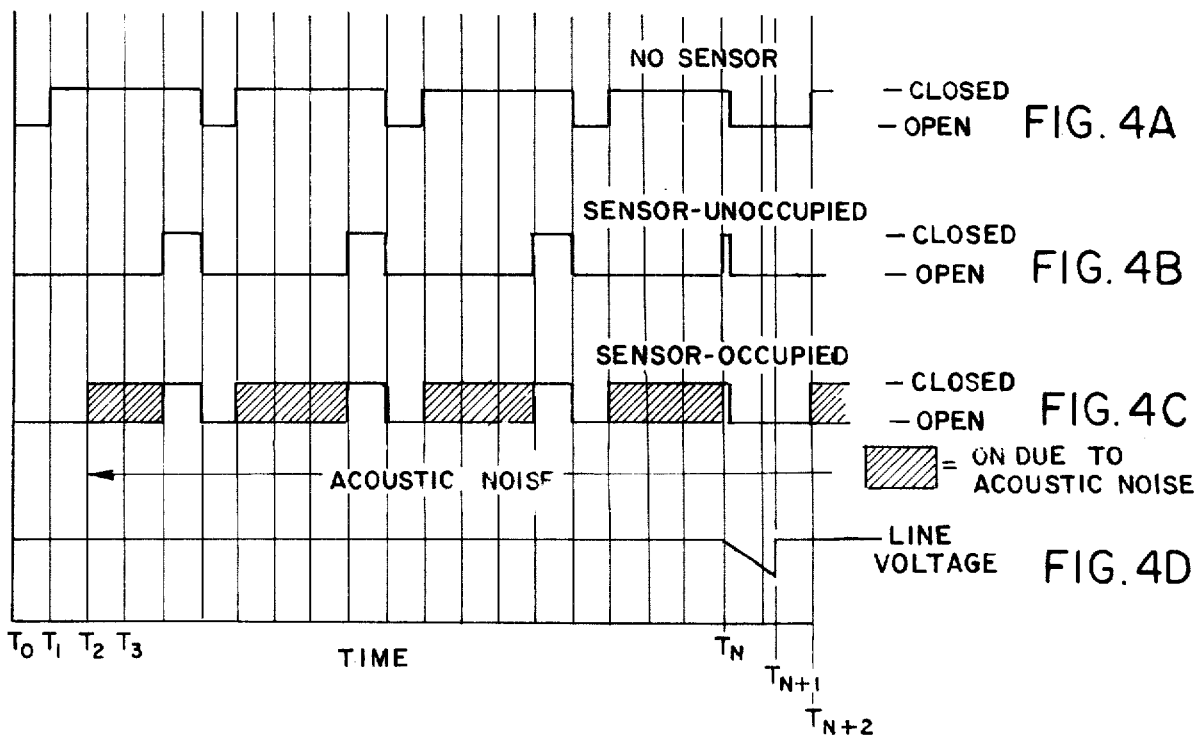

FIG. 1 illustrates the apparatus 10 comprising a controller and sensor 10A shown more particularly in FIGS. 2 and 3 connected to a conventional air conditioning system 12. Although the system 12 is illustrated as an air conditioning system, it should be understood that the instant invention may be implied to an air conditioning and/or a heating system or a heat pump functioning as both an air conditioner and a heater. Such a modification is considered to be within the teachings of the instant invention.

The system comprises a power source 14 shown as a single phase 220 volt or three phase power source connected through a relay 16 to the air conditioning compressor 18. A transformer 20 has a primary side 22 thereof connected between two terminals of the power source 14. The secondary 24 of transformer 20 is conventionally connected by class two wiring to a relay coil 26 through a thermostat 28. The thermostat 28 may comprise bimetal contacts wherein electrical conduction is provided through relay coil 26 to close relay 16 and provide power to compressor 18. The instant apparatus 10 may be conventially installed by severing connector 30 as indicated by the x and providing a conduction path by connectors 32 and 34 through a controllable switch means 36. Operating power for controller 10 is provided by an additional connector 38 in cooperation with connector 34. The controller 10 is connected by a multiple cable 40 to sensor 10A. Accordingly, when controller 10 opens controllable switch means 36, thermostat 28 is deactivated thereby preventing relay 16 from closing. The closing of controllable switch means 36 enable the activation of thermostat 28 which in turn may activate relay 16 upon closing the thermostat contacts. An optional thermostat 41 may be interposed in cable 40 as will be explained hereinafter.

FIG. 2 is a block diagram of the controller 10 and sensor 10A shown in FIG. 1. The controller 10 in the preferred form enables the thermostat 28 to close relay 26 for a reduced period of time for example 80% of a normal operating cycle. The controller 10 prevents operation of thermostat 28 for 20% of the operating cycle resulting in at least a 20% savings in air conditioning cost. As can be seen by FIG. 1, the apparatus can be readily installed on existing air conditioning or heating systems such as window air conditioning units in motels, hotels, and the like. The apparatus may also be incorporated within an air conditioning and/or heating system under present construction,.

The secondary 24 of transformer 20 is rectified by diodes 41 and 42. The half-cycle rectified waveform from diode 41 enters a wave shaper 44 to transform the rectified sine wave into square pulses. The output of wave shaper 44 is applied to a divider 46 which divides the input pulse to produce one output pulse for ever 192 input pulses. Accordingly, 3.600 pulses per minute enter divider 46 approximately ever two nd one quarter minutes. The output of divider 46 is applied to a decade counter and divider 48 by a conductor 50. The decade counter and divider 48 is sensitized to only positive going input pulses resulting in a meaningful input pulse being applied to decade counter and divider 48 every two minutes and 15 seconds. Upon receiving an input pulse, the decade counter and divider 48 sequentially advances a high output from position 0 to position 9 as indicated in FIG. 2. A high output in either position 0 or 1 is transferred by Or Gate 52 to open the normally closed contacts of controllable switch 36 by conduction through coil 54. Opening of switch 36 inhibits operation of the thermostat to prevent operation of compressor 18. Concomitantly therewith, an output from OR Gate 52 is transferred to an amplifier 56 to power light emitting diode 58. In addition the output is also connected to a light emitting diode 60 for indicating that the controller 10 has deactivated the thermostat 28. An output at position 2-9 of decade counter and divider 48 provides a zero signal to OR Gate 52 thereby closing the normally closed contacts of controllable switch 36 enabling conduction through thermostat 28 and relay coil 26. A resistor 62, typically two ohms, is connected in series with controllable switch 36 to provide a one volt output when used with a standard thermostat 28. The one volt output is insufficient to interrupt the operation of the thermostat 28 or relay 16 but is sufficient to drive a detector 64 from monitoring the voltage across resistor 62. Detector 64 is a monostable device, the output of which is connected by a connector 66 through an OR Gate 68 to a reset line 70 of the decade carrier and divider 48. If the thermostat line is opened by either thermostat or controllable switch 36 this means that compressor 18 is not functioning and the one volt output will not be present across resistor 62. The lack of output across resistor 62 reset the decade counter and divider 48 to the zero position. The decade counter and divider 48 must sequence through the 0 and 1 position before relay coil 26 can reenergize the compressor 18 at the position 2. This arrangement eliminates the possibility of a short cycle damaging the compressor 18. In many of the prior art mechanical energy savers, the rapid termination and activation of a compressor can damage the expensive parts due to unequal pressure and the like within the air conditioning compressor. The aforementioned circuit insures that once the compressor has terminated operation for any reason, it cannot restart until the timing circuit has counted a sufficient number of pulses, preferably 4 minutes and 33 seconds before restarting the compressor.

The output of diode 42 is applied by a connector 72 to a line voltage monitor 74. The line voltage monitor 74 provides an output on connector 72 to Or Gate 68 when the line voltage drops below a preselected minimum standard. Preferably, the voltage monitor 74 provides an output to OR Gate 68 when the line voltage drops below 85% of the desired line voltage of 24 volts of the secondary 24 of transformer 20. OR Gate 68 will reset decade carrier and divider 48 to the 0 position terminating operation of thermostat 28 and compressor 18 until the line voltage returns to the desired voltage level. The counter 48 will then begin counting and indexing to position 2, typically four and one half minutes before reactivating the thermostat 28. The output of diode 41 is isolated by diode 42 to drive a voltage regulator 78 to provide a low voltage power source 80 to operate the devices 10 and 10A.

The controller 10 provides three functions for the system shown in FIG. 1. First, the timer circuit deactivates the compressor for a first period of time, preferably two tenths of the total time, and enables activation of the compressor during the remaining second time period. Second, the controller 10 protects the compressor 18 against unequal pressures since the controller 10 prohibits operation of the compressor 18 for a period of four and one-half minutes any time the compressor terminates operation for any reason. Third, the controller 10 deactivates the compressor 18 for a minimum period of four and one-half minutes if the line voltage falls below a preselected desired value. The controller 10 provides distinct advantages over the prior art mechanical cyclers since a mechanical cycler cannot sense whether the compressor is in an active state. Accordingly, a mechanical cycler can restart a compressor in a 30 second period from the time operation of the compressor terminates. This time period is insufficient to enable equalization of gas pressure within the air conditioning compressor which may cause substantial damage to the unit. Many air conditioning experts are hesitant to recommend mechanical cyclers because of the damage caused by rapid cycling of compressors as a result of mechanical cyclers.

The sensor 10A is connected by multiple connector 40 and plug 84 to the controller 10. The occupancy sensor 10A further deactivates the compressor 18 during a period of inactivity within the room. The occupancy sensor 10A comprises an acoustical transducer such as a crystal microphone 86 connected to an amplifier 88, the output of which is applied to a filter network 90. The filter network 90 discriminates between acoustical output generated within the area being air conditioned and acoustical output generated outside the area being air conditioned. The filter network 90 will pass a signal of approximately 15 nanoseconds. Noise external of a room being air conditioned is transferred by vibration of objects and the like. Accordingly, noise generated external to the room lacks the sharpness and rise time to pass through filter network 90. Signals passed by filter network 90 are applied through an Or gate 92 to a monostable multivibrator 94. The monostable multivibrator 94 generates a uniform output irrespective of the input thereto. The output of the monostable multivibrator 94 is applied by connector 96 to a set-reset flip flop 98. If the output of flip flop 98 on conductor 100 is low, the sensor 10A has no effect on the controller 10. If the output of flip flop 98 on conductor 100 is high, OR gate 52 energizes coil 54 to open switch 36 as heretofore described.

Assuming counter 48 begins indexing from position 0, upon indexing to position 2, a high output is passed by connector 102 to monostable 104 to set flip flop 98 by line 106. This produces a high output on conductor 100 to open switch 36. If an acoustic output is sensed within the area being air conditioned an output by filter 90 will reset flip flop 98 to provide a low output on conductor 100 to close switch 36. The sensor 10A will terminate operation of the thermostat 28 during periods of inactivity within the area each time counter 48 produces an output at position 2.

In either event, the sequential outputs continue until a high output is produced in position 8. The high output is passed by a reset line 108 to OR gate 92 to reset flip flop 98 through reset line 96. The reset line 108 insures that irrespective of the activity within the room being air conditioned the compressor 18 will be activated a portion of the time by virtue of the reset line 108. Accordingly, the combination controller 10 and sensor 10 provide a minimum of 20% compressor on time and a maximum of 80% compressor off time with the actual operation time of the compressor 18 being determined by the activity within the room as determined by the acoustical transducer 86. It should be understood that the foregoing relates to time in which the thermostat 28 can activate or close relay 16. It should be understood that if demand is not required by the thermostat 28, the thermostat 28 will not close relay 16 to energize the compressor 18. It should also be understood that the 80% and 20% times heretofore described are merely an illustration and any time relationship can be incorporated within this invention. The optional thermostat 41 shown in FIGS. 1 and 2 disables the sensor 10A if the temperature rises above some desired temperature level. The optional thermostat insures that temperature control has priority over activity within the area after the temperature exceeds a desired level.

FIGS. 4A–4D illustrate all of the possible timing combinations generated by the circuit disclosed herein. The horizontal axis represents time with each division being equivalent to approximately four and one-half minutes. FIG. 4A shows the position of switch 36 as a function of time for the controller 10 without sensor 10A. Switch 36 is open for the first four and one-half minutes for the time required to count a sufficient number of pulses to index decade counter and divider 48 to position 2. The controller 10 then cycles the switch 36 to close the switch 80% of the time while opening the switch 36 the remaining 20% of the time. FIG. 4D shows the AC line voltage as $T_n$ and returning to normal at $T_n+1$. The line voltage detector 74 in combination with OR gate 68 and line 70, resets decade counter and divider 48 and continues to maintain the compressor in the deactivated state until $T_n+2$ even though the voltage returned to normal at $T_n+1$.

FIG. 4B illustrates the position of switch 36 for the controller 10 and sensor 10A in an unoccupied room. In this embodiment, the lack of acoustical output by filter network 90 reduces the activation time of thermostat 28. The only activation produced is due to reset line 108 which closes switch 36 approximately 20% of the time. In a similar manner, the reduction of line voltage approximately at $T_n$ opens switch 36 as heretofore set forth.

FIG. 4C illustrates the condition of switch 36 for the controller 10 and sensor 10A in an occupied room. The cycler begins in a similar manner to FIG. 4B with an occupant entering the room at $T_2$. The shaded areas indicated the period of on time due to an acoustical disturbance being detected by the acoustical transducer 86. Accordingly, the controller 10 closes switch 36 80% of the time and opens switch 36 20% of the time. The operation of the circuit during the low line voltage is similar to that shown in FIG. 4A.

FIG. 3 is a detailed schematic view of the block diagram shown in FIGS. 1 and 2. The basic operation of the circuit has been described in reference to FIG. 2 and only further details will be described with reference to FIG. 3. A resistor-capacitor combination 110 suppresses the input to protect the transistors and integrated circuits contained within the circuit. The output of first diode 41 is applied to a transistor 44 which comprises the waveshaper shown in FIG. 2. The output of transistor 44 is applied to the divider 46 which is connected to the decade counter and divider 48. The output of the decade counter and divider 48 is applied by a plurality of diodes functioning as OR gate 52 to a transistor 112 to drive the relay switch 36 and the light emitting diodes 58 and 60. The potential developed across resistor 62 is stored in a capacitor 114 to provide a voltage for operating transistor 116 to keep a second transistor 118 in a nonconducting state. The full supply voltage is developed across transistor 118 during a voltage on capacitor 114. The current across resistor 120 is esstentially zero due to the nonconducting state of transistor 118. Upon loss of charge on capacitor 114, transistor 116 will cease to conduct and transistor 118 will conduct causing the voltage on the collector of transistor 118 to change from a high state to a low state. Capacitor 122 interconnects transistor 118 through OR gate shown as transistor 68 to reset line 70. Upon conduction of transistor 118, transistor 68 is momentarily nonconducting enabling resistor 124 to reset decade counter 48 on line 70.

Resistor 124 is connected to reset line 70 with the other end thereof connected to a positive terminal of the power supply. Resistors 126 and 128 form a voltage divider between the unregulated portion of the power supply with a Zener diode 130 connecting the divided voltage to the base of transistor 68. When the line voltage falls below the Zener diode breakdown voltage, the base current of transistor 68 is terminated, thereby providing a high output on reset line 70 to the decade counter 48 to reset the counter upon a reduction of line voltage.

The sensor circuit 10A shown in FIG. 3 comprises a separate power supply filter section comprising filter capacitors 132 and 134 which are isolated from the regulator 78 and filter capacitor 136 by the second diode 42. Filter capacitor 136 is small to discharge quickly during a loss or voltage reduction in the line voltage. This enables the circuit to immediately detect a reduction in line voltage. The larger capacity of capacitors 132 and 134 is required to operate the sensor circuit 10A. The amplifier 88 shown in FIG. 2 comprises a first amplifier 88A coupled to a second amplifier 88B to provide a gain of approximately ten thousand. The output of amplifier 88B is applied to the filter network 90 comprising capacitor 140 and 142. Capacitor 142 is larger in capacity than capacitor 140. A rapid rise time signal will be passed by both the capacitors 140 and 142 whereas a slow rise time signal will be dissipated by resistor 144. The monostable multivibrator 94 is shown in this embodiment to be an amplifier with a capacitor resistor feedback network to provide an output to amplifier 98 which is wired to be a set and reset flip flop. When the output of amplifier 98 is low, the noninverting input is held through resistor 146 in a lower state than the state of the inverting input. When the inverting input is high, the output is high which is applied back to the noninverting input to provide a set and reset flip flop.

The foregoing has described a novel controller 10 and occupancy sensor 10A which is a substantial contribution to the air conditioning and heating art. The control divides a timing cycle to activate the thermostat a maximum of 80% of the time and deactivate the thermostat for a minimum of 20% of the time. A low voltage sensor terminates operation of the thermostat in the event of a reduction in line voltage below a preestablished level. The circuit prevents operation of the compressor for a period of approximately four and one-half minutes in the event the compressor terminates operation for any reason. The optional occupancy sensor varies the actual activation time of the thermostat in accordance with the physical activity within the area being air conditioned. The normally closed switch 36 allows the thermostat to operate in normal fashion in the event of failure of the controller 10 or the sensor 10A.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:
What is claimed is:

1. An apparatus for activating a thermostat for an air conditioning or heating system, the thermostat controlling power from a power source to the air conditioning or heating system, comprising in combination:
   a timing circuit providing a first output during a first timing period and a second output during a second timing period;
   a controllable switch means connected to activate or deactivate the thermostat controlling of the air conditioning or heating system;
   means for connecting said first output to said controllable switch means for deactivating the thermostat during said first timing period;
   means for connecting said second output to said controllable switch means for activating said thermostat during said second timing period thereby enabling the thermostat to power the air conditioning or heating system;
   thermostat line sensor means for sensing the condition of said controllable switch means and the thermostat to reset said timing circuit to said first timing period upon termination of power to the air conditioning or heating system;
   power source sensor means for sensing the level of available power from the power source to reset said timing circuit to said first timing period upon a reduction in the level of the power source below a preestablished minimum power level.

2. An apparatus as set forth in claim 1, wherein said power source sensor means comprises a capacitor for storing a charge in accordance with the power level of the power source; and
   means for comparing the voltage on said capacitor to a preestablished voltage standard.

3. An apparatus as set forth in claim 1, wherein said power source sensor means continuously resets said timing circuit to said first timing period until the power source returns to said preselected minimum power level.

4. An apparatus as set forth in claim 1, wherein the thermostat controls a power switch interconnecting the power source and the air conditioning or heating system; and
   said controllable switch means being connected in electrical series with the thermostat.

5. An apparatus as set forth in claim 4, wherein said thermostat line sensor means includes a voltage sensor connected to said controllable switch means; and
   a monostable device connected to said voltage sensor for resetting said timing circuit.

6. An apparatus for activating a thermostat for an air conditioning or heating system, the thermostat controlling power from a power source to the air conditioning or heating system, comprising in combination:
   a timing circuit providing a first output during a first timing period and a second output during a second timing period;
   said timing circuit includes a counter for counting at least a portion of the cycles of an alternating current power source;
   said timing circuit includes a divider circuit for providing a divider circuit output upon said divider circuit counting a preselected number of input pulses;
   a controllable switch means connected to activate or deactivate the thermostat controlling of the air conditioning or heating system;
   means for connecting said first output to said controllable switch means for deactivating the thermostat during said first timing period;
   means for connecting said second output to said controllable switch means for activating said thermostat during said second timing period thereby enabling the thermostat to power the air conditioning or heating system;
   thermostat line sensor means for sensing the condition of said controllable switch means and the thermostat to reset said timing circuit to said first timing period upon termination of power to the air conditioning or heating system; and
   power source sensor means for sensing the level of available power from the power source to reset said timing circuit to said first timing period upon a reduction in the level of the power source below a preselected minimum power level.

7. An apparatus as set forth in claim 6, wherein said timing circuit includes a wave shaper for modifying the alternating current waveform for counting by said counter.

8. An apparatus as set forth in claim 6, wherein said counter provides said first output while counting a first number of input pulses and providing said second output upon counting said first number of input pulses; and
   said counter providing said second output while counting a second number of input pulses and providing said first output upon counting said second number of input pulses.

9. An apparatus for activating a thermostat for an air conditioning or heating system, the thermostat controlling power from an alternating current power source to the air conditioning or heating system, comprising in combination:

a divider circuit for providing a divider circuit output upon said divider circuit counting a preselected number of input signals from the alternating current power source;

a counter for counting the output signals of said divider circuit for providing a first output while counting a first number of signals and alternately providing a second output while counting a second number of signals;

a controllable switch means connected to activate or deactivate the thermostat controlling of the air conditioning or heating system;

means for connecting said first output to said controllable switch means for deactivating the thermostat during said first timing period;

means for connecting said second output to said controllable switch means for activating said thermostat during said second timing period thereby enabling the thermostat to power the air conditioning or heating system;

presence sensor for sensing the presence of acoustic emission within the area being air conditioned or heated; and means connecting the output of said presence sensor to said controllable switch means for deactivating said thermostat during a portion of said second timing period upon said presence sensor detecting the absence of acoustical emission within the area being air conditioned or heated.

10. An apparatus for activating a thermostat for an air conditioning or heating system, the thermostat controlling power from a power source to the air conditioning or heating system, comprising in combination:

a timing circuit providing a first output during a first timing period and a second output during a second timing period;

a controllable switch means connected to activate or deactivate the thermostat controlling of the air conditioning or heating system;

means for connecting said first output to said controllable switch means for deactivating the thermostat during said first timing period;

means for connecting said second output to said controllable switch means for activating said thermostat during said second timing period thereby enabling the thermostat to power the air conditioning or heating system;

presence sensor for sensing the presence of acoustic emission within the area being air conditioned or heated; and means connecting the output of said presence sensor to said controllable switch means for deactivating said thermostat during a portion of said second timing period upon said presence sensor detecting the absence of acoustical emission within the area being air conditioned or heated.

11. An apparatus for activating a thermostat for an air conditioning or heating system, the thermostat controlling power from a power source to the air conditioning or heating system, comprising in combination:

a timing circuit providing a first output during a first timing period and a second output during a second timing period;

a controllable switch means connected to activate or deactivate the thermostat controlling of the air conditioning or heating system;

means for connecting said first output to said controllable switch means for deactivating the thermostat during said first timing period;

means for connecting said second output to said controllable switch means for activating said thermostat during said second timing period thereby enabling the thermostat to power the air conditioning or heating system;

presence sensor for sensing the presence of acoustic emission within the area being air conditioned or heated;

means connecting the output of said presence sensor to said controllable switch means for deactivating said thermostat during a portion of said second timing period upon said presence sensor detecting the absence of acoustical emission within the area being air conditioned or heated;

said presence sensor includes an acoustic transducer disposed within the area being air conditioned or heated;

a filter network interconnecting said acoustic transducer to said controllable switch means for deactivating said thermostat during a portion of said timing period during an absence of signal passed by said filter; and means connecting said presence sensor to said timing circuit for activating said controllable switch means during at least a portion of said second timing period irrespective of the output of said presence sensor.

12. An apparatus for activitating a thermostat for an air conditioning or heating system, the thermostat controlling power from a power source to the air conditioning or heating system, comprising in combination:

a timing circuit providing a first output during a first timing period and a second output during a second timing period;

a controllable switch means connected to activate or deactivate the thermostat controlling of the air conditioning or heating system;

means for connecting said first output to said controllable switch means for deactivating the thermostat during said first timing period;

means for connecting said second output to said controllable switch means for activating said thermostat during said second timing period thereby enabling the thermostat to power the air conditioning or heating system;

thermostat line sensor means for sensing the condition of said controllable switch means and the thermostat to reset said timing circuit to said first timing period upon termination of power to the air conditioning or heating system;

power source sensor means for sensing the level of available power from the power source to reset said timing circuit to said first timing period upon a reduction in the level of the power source below a preselected minimum power level;

presence sensor for sensing the presence of movement within the area being air conditioned or heated; and means connecting the output of said presence sensor to said controllable switch means for deactivating the thermostat during at least a portion of said second timing period upon said presence sensor detecting an absence of movement within the area being air conditioned or heated.

13. An apparatus as set forth in claim 12, including means connecting said presence sensor to said timing circuit for activating said controllable switch means during at least a portion of said second timing period irrespective of the output of said presence sensor.

14. An apparatus as set forth in claim 12, including a second thermostat for deactivating said presence sensor upon said second thermostat sensing a temperature above a desired level.

15. An apparatus for activating a thermostat for an air conditioning or heating system, the thermostat controlling power from a power source to the air conditioning or heating system, comprising in combination:

- a timing circuit providing a first output during a first timing period and a second output during a second timing period;
- a controllable switch means connected to activate or deactivate the thermostat controlling of the air conditioning or heating system;
- means for connecting said second output to said controllable switch means for deactivating the thermostat during said first timing period;
- means for connecting said second output to said controllable switch means for activating said thermostat during said second timing period thereby enabling the thermostat to power the air conditioning or heating system;
- thermostat line sensor means for sensing the condition of said controllable switch means and the thermostat to reset said timing circuit to said first timing period upon termination of power to the air conditioning or heating system;
- power source sensor means for sensing the level of available power from the power source to reset said timing circuit to said first timing period upon a reduction in the level of the power source below a preselected minimum power level;
- presence sensor for sensing the presence of movement within the area being air conditioned or heated;
- means connecting the output of said presence sensor to said controllable switch means for deactivating the thermostat during at least a portion of said second timing period upon said sensor detecting and absence of movement within the area being air conditioned or heated;
- said presence sensor includes an acoustic transducer for detecting acoustic output of movement within the area being air conditioned or heated; and
- filter network interconnecting said acoustic transducer to said controllable swithc means.

* * * * *